(12) United States Patent
Salgueiro et al.

(10) Patent No.: US 10,469,460 B2
(45) Date of Patent: Nov. 5, 2019

(54) DATA SHARING IN A BLOCKCHAIN-ENABLED TRUST DOMAIN

(71) Applicant: Cisco Technology, Inc., San Jose, CA (US)

(72) Inventors: Gonzalo Salgueiro, Raleigh, NC (US); Chidambaram Arunachalam, Cary, NC (US); Felipe Ignacio Garrido, Raleigh, NC (US)

(73) Assignee: Cisco Technology, Inc., San Jose, CA (US)

( * ) Notice: Subject to any disclaimer, the term of this patent is extended or adjusted under 35 U.S.C. 154(b) by 238 days.

(21) Appl. No.: 15/489,087

(22) Filed: Apr. 17, 2017

(65) Prior Publication Data

US 2018/0302215 A1 Oct. 18, 2018

(51) Int. Cl.
H04L 9/32 (2006.01)
H04L 29/06 (2006.01)
H04L 29/08 (2006.01)

(52) U.S. Cl.
CPC ........ H04L 63/0428 (2013.01); H04L 9/3239 (2013.01); H04L 65/1083 (2013.01); H04L 65/403 (2013.01); H04L 65/4023 (2013.01); H04L 67/22 (2013.01); *H04L 63/062* (2013.01); *H04L 63/101* (2013.01); *H04L 2209/38* (2013.01)

(58) Field of Classification Search
CPC . H04L 63/0428; H04L 63/101; H04L 9/0637; H04L 9/0643; H04L 9/0819; H04L 9/14; H04L 9/30
USPC ........................................................ 713/168
See application file for complete search history.

(56) References Cited

U.S. PATENT DOCUMENTS

2007/0198534 A1* 8/2007 Hon ........................ G06F 16/44
2008/0056241 A1 3/2008 Haddad et al.
2010/0095122 A1 4/2010 Bettger et al.
2016/0321654 A1* 11/2016 Lesavich ............ G06F 21/6245
(Continued)

OTHER PUBLICATIONS

Professors Michael Mainelli and Mike Smith, "Sharing ledgers for sharing economies: an exploration of mutual distributed ledgers (aka blockchain technoloy)", The Journal of Financial Perspectives: FinTech, EY Global Financial Services Institute, Winter 2015, vol. 3—Issue 3, ISSN 2049-8640, 47 pages.

(Continued)

*Primary Examiner* — Samson B Lemma
(74) *Attorney, Agent, or Firm* — Edell, Shapiro & Finnan, LLC

(57) ABSTRACT

One or more servers store data defining a trust domain among a plurality of entities that participate in supporting a multimedia communication session, each of the plurality of entities having at least one network device that is involved in handling traffic or control signaling for the multimedia communication session. The one or more servers receive from one or more network devices associated with each of the plurality of entities session data generated by the respective network devices in supporting the multimedia communication session. The one or more servers log the session data received from the network devices of the plurality of entities of the trust domain as a blockchain transaction, and share logged session data with one or more devices associated with at least one of the plurality of entities of the trust domain.

20 Claims, 11 Drawing Sheets

(56) References Cited

U.S. PATENT DOCUMENTS

| | | |
|---|---|---|
| 2017/0031874 A1 | 2/2017 | Boudville |
| 2017/0134162 A1* | 5/2017 | Code ........................ G06F 21/10 |
| 2018/0025166 A1* | 1/2018 | Daniel .................... G06Q 10/06 |
| | | 713/189 |
| 2018/0121635 A1* | 5/2018 | Tormasov ............. G06F 21/645 |
| 2018/0247191 A1* | 8/2018 | Katz ........................ G06N 3/08 |

OTHER PUBLICATIONS

Dimitri De Jonghe & Trent McConaghy, "Copyright on the Blockchain: SPOOL Protocol", Specification and Reference Application, May 7, 2015, 39 pages.

P. Jones, et al., "End-to-End Session Identification in IP-Based Multimedia Communication Networks", Internet Engineering Task Force, ISSN: 2070-1721, RFC 7989, Oct. 2016, 39 pages.

P. Dawes, et al., "Requirements for Marking SIP Messages to be Logged", draft-ietf-insipid-logme-reqs-12, Internet Engineering Task Force, Internet-Draft, Jan. 16, 2017, 9 pages.

\* cited by examiner

| KMS |
|---|
| SESSION 1; KEY 1 |
| SESSION 2; KEY 2 |
| ... |

| TRUST DOMAIN ROSTER |
|---|
| MEMBERS |
| COMPANY 1 |
| COMPANY 2 |
| SP1 |
| SP2 |
| SP3 |

| GLOBAL TRUSTED SESSION LEDGER |
|---|
| BLOCK |
| SESSION1, DATA A>B |
| SESSION1, DATA C>D |
| SESSION1, DATA E>F |
| SESSION1, DATA G>H |
| ... |

DATA SHARING IN A BLOCKCHAIN-ENABLED TRUST DOMAIN

TECHNICAL FIELD

The present disclosure relates to multimedia communication sessions.

BACKGROUND

Collecting data for a multimedia communication session across multiple enterprises and service providers has challenges. There is no common data repository or an established trust relationship between the interested parties to facilitate the sharing of information. It is complex to discover the data path and collect session data across the disparate systems. This makes troubleshooting multimedia communication session cumbersome and time consuming.

BRIEF DESCRIPTION OF THE DRAWINGS

FIG. 5A shows a Key Management Storage that stores unique private keys according to an example embodiment.

FIG. 5B shows a trust domain roster according to an example embodiment.

FIG. 5C shows a global trusted session ledger according to an example embodiment.

DESCRIPTION OF EXAMPLE EMBODIMENTS

Overview

In one embodiment, one or more servers store data defining a trust domain among a plurality of entities that participate in supporting a multimedia communication session, each of the plurality of entities having at least one network device that is involved in handling traffic or control signaling for the multimedia communication session. The one or more servers receive from one or more network devices associated with each of the plurality of entities session data generated by the respective network devices in supporting the multimedia communication session. The one or more servers log the session data received from the network devices of the plurality of entities of the trust domain, and share logged session data with one or more devices associated with at least one of the plurality of entities of the trust domain.

EXAMPLE EMBODIMENTS

Presented herein are an apparatus, system and method to facilitate data sharing among a plurality of service providers and enterprises (collectively entities) participating in a multimedia communication session in a trust domain. One or more servers coupled to one or more network devices associated with each of the plurality of entities log session data generated by the respective network devices as transactions in a blockchain to be shared by client devices associated with the entities. Embodiments disclosed herein leverage blockchain technology to provide a secure and distributed approach for establishing trust among the interested parties and facilitate the collection of communication session-related data in a parallel fashion.

Figure 1:
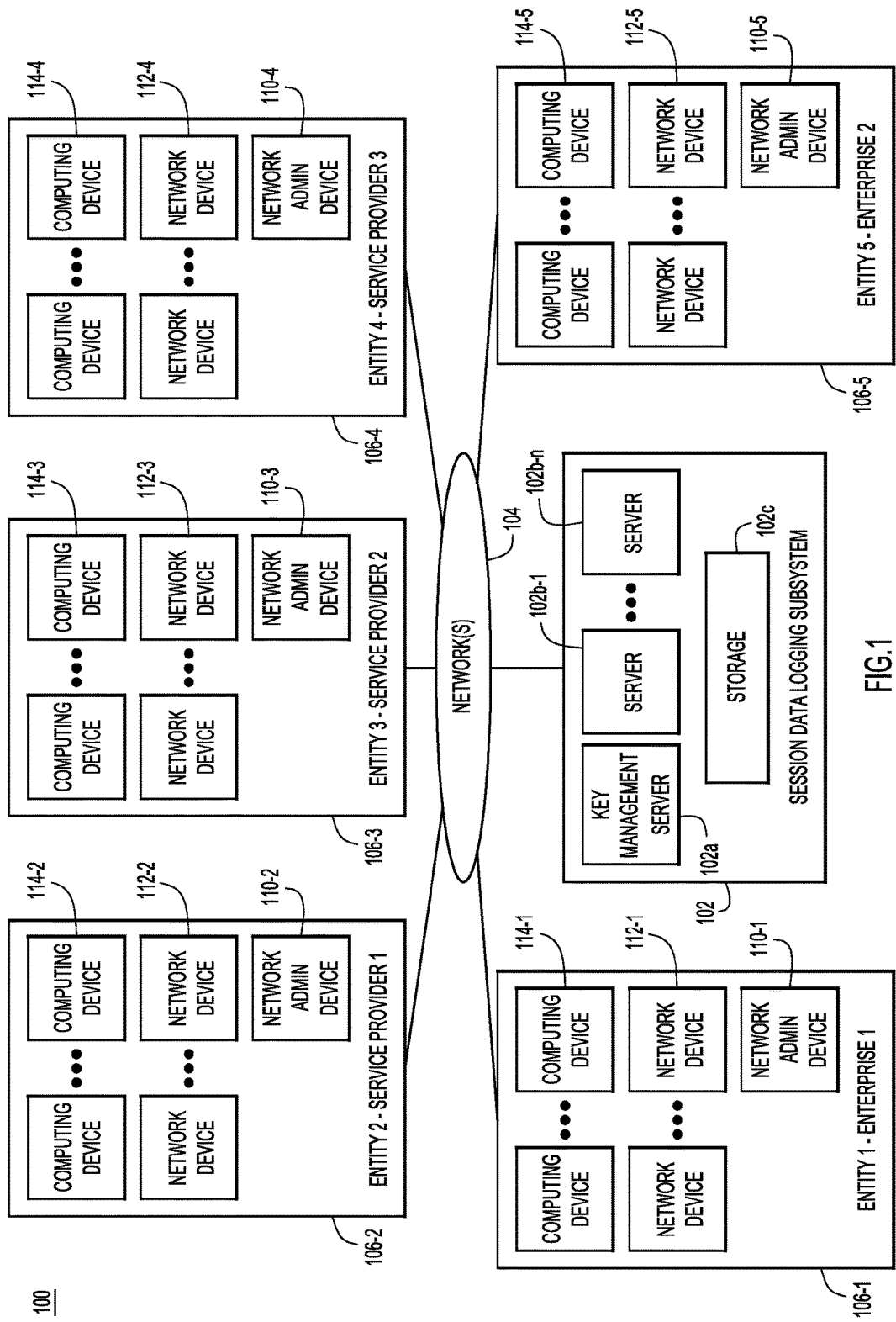
FIG. 1 depicts a block diagram of a multimedia communication system including a plurality of entities and servers and in which one or more trust domains are defined to facilitate the sharing of session data, according to an example embodiment.

FIG. 1 depicts a communication system 100 in which session data can be securely shared among a plurality of entities according to an example embodiment. The system 100 includes a session data logging subsystem 102, one or more networks, 104, and a plurality of entities 106-1, 106-2, 106-3, 106-4, and 106-5 (collectively 106). The session data logging subsystem 102 and the plurality of entities 106 are coupled to each other through the network(s) 104. Although five entities are shown in FIG. 1, it is to be understood that more or less than five entities can be present in the system 100.

The session data logging subsystem 102 includes a key management server 102a, one or more trust domain servers 102b-1, 102b-2 ... 102b-n (collectively 102b), and a storage 102c. The key management server 102a is configured to manage keys used to encrypt logged confidential session data for any multimedia communication sessions. For example, the key management server 102a can generate a unique private key for each of multimedia communication sessions and forward the unique private key to network devices associated with the entities participating in a particular multimedia communication session. Each of the entities participating in the multimedia communication session may then use the unique private key to encrypt and decrypt logged session data as will be described in detail below.

The one or more trust domain servers 102b are configured to perform various operations supporting multimedia communication sessions among the entities 106, including, for example, storing data defining a trust domain among a plurality of entities that participate in supporting a multimedia communication session, receiving from one or more network devices associated with each of the plurality of entities session data generated by the respective network devices in supporting the multimedia communication session, logging the session data received from the network devices of the plurality of entities of the trust domain, and sharing of logged session data with one or more devices associated with at least one of the plurality of entities of the trust domain. Further description of the operations of the one or more trust domain servers 102b is provided below.

The storage 102c is configured to store, for example, session data generated in each of the multimedia communication sessions, and trust-domain rosters including at least domain names and members in each domain. The storage 102c may include read only memory (ROM), random access memory (RAM), magnetic disk storage media devices, optical storage media devices, flash memory devices, electrical, optical or other physical/tangible memory storage devices.

Each of the entities 106 includes a network administration device 110, one or more network devices 112, and one or more computing devices 114. For example, with reference to FIG. 1, Entity 1 (106-1) includes a network administration device 110-1, one or more network devices collectively identified by reference numeral 112-1, and one or more computing device collectively identified by reference numeral 114-1. Entity 2 (106-2) includes a network administration device 110-2, one or more network devices collectively identified by reference numeral 112-2, and one or more computing device collectively identified by reference numeral 114-2. Entity 3 (106-3) includes a network administration device 110-3, one or more network devices collectively identified by reference numeral 112-3, and one or more computing device collectively identified by reference numeral 114-3. Entity 4 (106-4) includes a network administration device 110-4, one or more network devices collectively identified by reference numeral 112-4, and one or more computing device collectively identified by reference numeral 114-4. Entity 5 (106-5) includes a network administration device 110-5, one or more network devices collectively identified by reference numeral 112-5, and one or more computing device collectively identified by reference numeral 114-5. The network administration device 110 is used to configure and monitor the network devices 112. Each network device 112 is configured to establish communications with other network devices directly or through one or more networks, e.g., network 104. The network device 112 also generates session data in a form of metadata including time and events, encrypts confidential session data, and logs the session data as blockchain transactions. Each network administrator device 110 or the computing device 114 may be a server or computer in an entity to support various troubleshooting or analysis operations for the entity, such as generating requests for session data for one or more multimedia communication sessions of interest.

Figure 2:
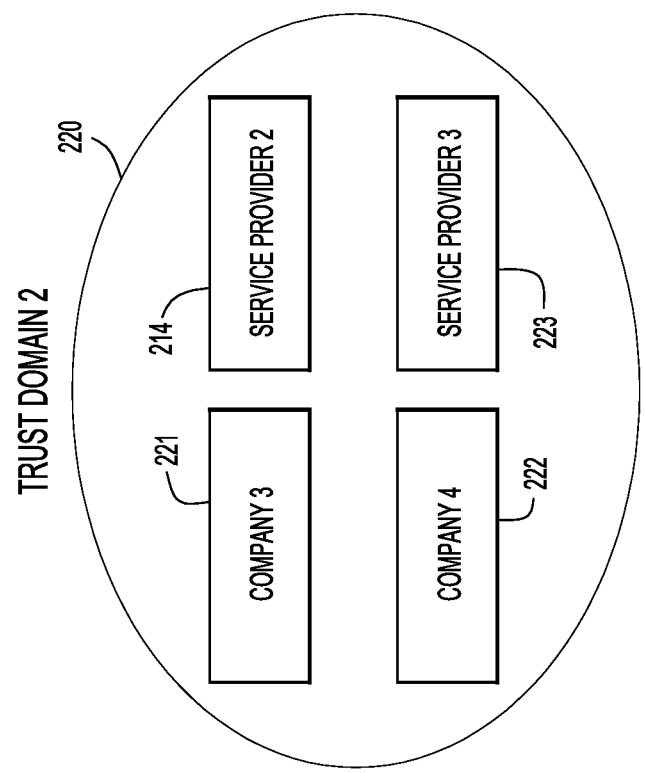
FIG. 2 depicts the formation of trust domains, according to an example embodiment.
Figure 2:
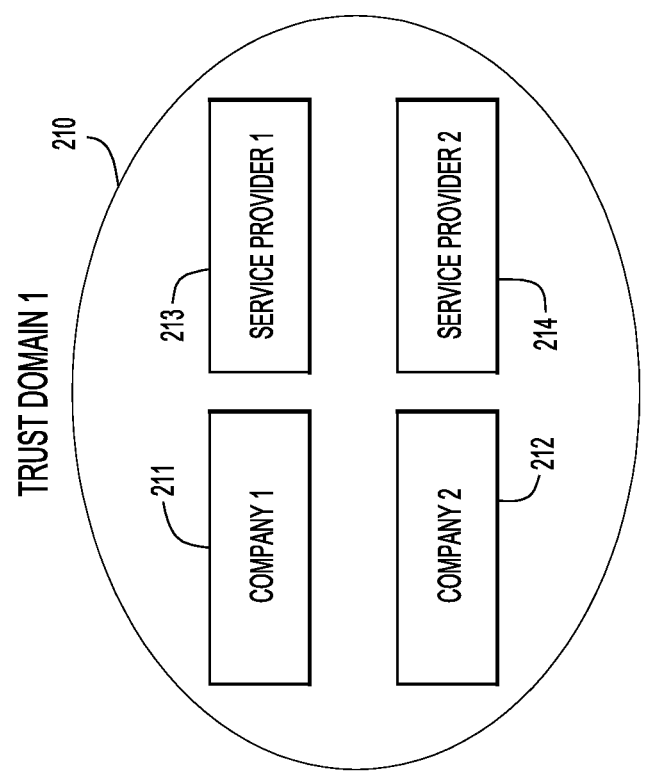

In one embodiment, two or more entities can form a trust domain. Each of the entities in a trust domain agrees to a set of rules for the trust domain. For example, the rules may allow entities to the trust domain to (1) log and share session data, (2) pass protocol signaling messages without removal of or modification to specific headers (i.e., session identifiers, etc.) by devices such as a session border controller (SBC), and (3) authorize domain-based feature enablement for sessions established among the trusted domain members. In one embodiment, a trust domain can include enterprise entities (Entity 1 and Entity 5 in FIG. 1) and a plurality of service providers (Entities 2-4 in FIG. 1). In addition, an entity can join any number of trust domains. For example, referring now to FIG. 2, two example trust domains 210 and 220 are shown. Trust Domain 1 (210) includes Company 1 (211), Company 2 (212), Service Provider 1 (213), and Service Provider 2 (214), and Trust Domain 2 (220) includes Company 3 (221), Company 4 (222), Service Provider 2 (214), and Service Provider 3 (223). In this example, Service Provider 2 (214) is present in both Trust Domain 1 and Trust Domain 2. Because a trust domain may allow its members to share session data they generate, sharing of session data among members of a trust domain become less cumbersome. The scale of a trust domain can vary based on need. For example, a trust domain can be established within an organization, with access to only internal devices, across multiple organizational units, or across multiple companies and service provider entities.

Referring back to FIG. 1, a trust domain including Entities 1-5, which participate in supporting a multimedia communication session, is managed by the session data logging subsystem 102. It is to be understood that the trust domain may include one or more other entities (not shown), which do not participate in supporting the multimedia communication session. In the example in FIG. 1, Entities 1 and 5 are enterprises while Entities 2-4 are service providers between Entities 1 and 5. That is, a multimedia communication session can originate from the first enterprise Entity 1 (106-1), pass through service providers Entities 2-4 (106-2, 106-3, and 106-4), and end at the second enterprise Entity 2 (106-5). During the multimedia communication session, each of the entities records its operations/transaction associated with the session in a form of metadata, including operations it performed, signaling protocol messages, time and duration of each operation, total time for the operations, etc. In the case of a call from Entity 1 (106-1) to Entity 5 (106-5), session data may include a session identifier, error code(s), error text(s), a call identifier, a calling number/uniform resource identifier (URI), a called number/URI, negotiated codecs, negotiated bandwidth, negotiated Dual Tone Multiple Frequency (DTMF), Session Initiation Protocol (SIP) messages, etc. These session data are sent to the session data logging subsystem 102 and recorded as transactions in a blockchain and to be stored therein. In one embodiment, each entity may encrypt the session data that may be considered private before sending the session data to the session data logging subsystem 102. The generated session data may or may not be sent to the session data logging subsystem 102 in real-time during the communication session. For example, an entity may wait until a transaction is completed to send all session data in that transaction at once.

The session data logging subsystem 102 stores the session data from each of the entities as transactions in a blockchain. For example, call signaling messages exchanged between two entities in a multimedia communication session can be logged as a transaction in a blockchain. Multiple transactions are logged and chained together as a block according to their sequence in time. The data stored in the blocks cannot be modified so that transactions can be truthfully reflected and ready for inspection at a later time. For example, if a call originated, by Entity 1 (106-1), supported by Entities 2-4, to end at Entity 5 fails, the session data for this call stored in a blockchain can be traversed to determine the root cause for the failure. For example, Entity 2 (106-2) may use the network administrator device 110-2 or the computing device 114-2 to generate a request for session data and send the request to session data logging subsystem 102.

In some embodiments, the key management server 102a in the session data logging subsystem 102 can generate a unique private key for each multimedia communication session. That is, the key management server 102a generates private keys on a per session basis. The session data logging subsystem 102 then provides the unique private key to the requesting network devices associated with each of entities 106 participating in supporting the multimedia communication session in a trust domain. The entities 106 may use the unique private key to encrypt session data. For example, the entities 106 may encrypt session data of a particular session that may be considered private to the entities participating in supporting the multimedia communication session. In the call scenario described above, the call identifier, calling number/URI, called number/URI, negotiated codecs, negotiated bandwidth, negotiated DTMF, and SIP messages can be encrypted while the session identifier, error code(s), error text(s) remain unencrypted. In this way, only entities having the unique private key may access the private data of the session data. Specifically, an entity can access the private data by using the unique private key to decrypt the encrypted session data. Session data that may be considered public in a trust domain may remain unencrypted to be shared among entities in the trust domain.

When a session starts, ends, or is modified, one or more of the trust domain servers 102b-1 to 102b-n of the session data logging subsystem 102 receives and stores session data generated by the entities 106 participating in the multimedia communication session in, for example, storage 102c. Any one of the entities may send a request to session data logging subsystem 102 for accessing the session data stored in storage 102c. Upon receiving the request, the one or more trust domain servers 102b-1 to 102b-n of the session data logging subsystem 102 determines whether the request is authorized by the trust domain. For example, the session data logging subsystem 102 can check an entity identifier or a device identifier of the network device or network administrator that sends the request. If the entity sending the request belongs to the trust domain for which the session data is being requested, the session data logging subsystem 102 determines that the request is authorized by the trust domain. If the one or more trust domain servers 102b-1 to 102b-n of the session data logging subsystem 102 determines that the request is not authorized by the trust domain, the session data logging subsystem 102 rejects the request and does not return any session data to the entity that requests the session data. If the session data logging subsystem 102 determines that the request is authorized by the trust domain, the session data logging subsystem 102 further determines whether the request is authorized for private session data. For example, the session data logging subsystem 102 can determine whether the entity that sends the request participated in the multimedia communication session. If the session data logging subsystem 102 determines that the entity did not participate in the session, the session data logging subsystem 102 determines that the request is not authorized for private data. The session data logging subsystem 102 then returns only public data of the session data to the requesting entity. If the session data logging subsystem 102 determines that the entity participated in the session, the session data logging subsystem 102 determines that the request is authorized for private data and returns both public and private data of the session data to the requesting entity. In one embodiment, the private data are encrypted with a unique private key. The receiving entity may use the unique private key for the session it receives from the session data logging subsystem 102 to decrypt the encrypted private data so as to access the private data. Access to the private data can also be governed by other policies. For example, a selected set of entities may be given access to the private data even if they are not part of the multimedia communication session.

In one embodiment, once the one or more trust domain servers 102b-1 to 102b-n of the session data logging subsystem 102 determines that the request for accessing session data is authorized by the trust domain, the session data logging subsystem 102 forwards/returns both public and encrypted private data of the session data to the requesting entity. If the requesting entity has the unique private key for the session, the requesting entity can use the unique private key to decrypt the encrypted private data. If the requesting entity does not have the unique private key for the session, the requesting entity can access only the public data of the session data.

Figure 3:
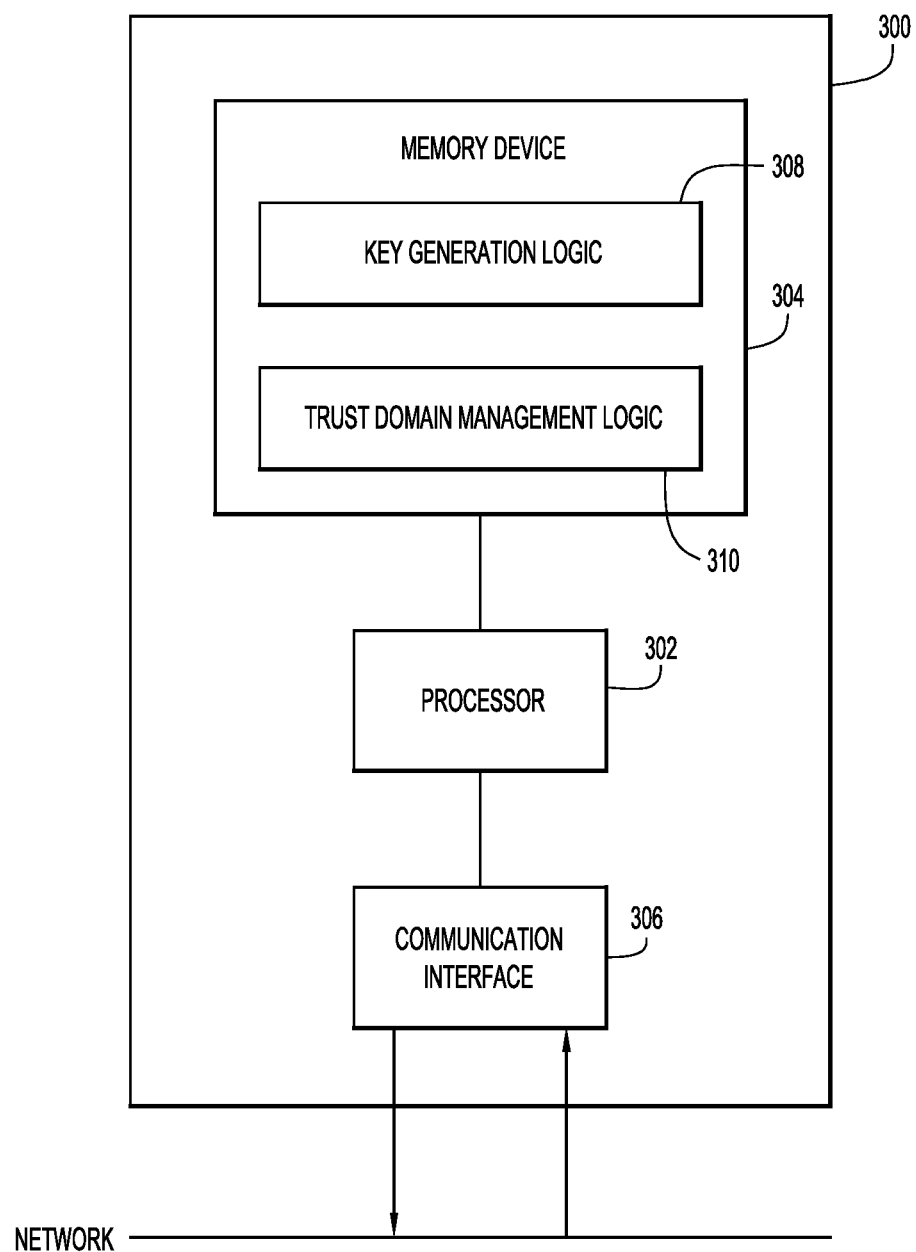
FIG. 3 is a block diagram of a server configured to facilitate the sharing of session data, according to an example embodiment.

FIG. 3 is a block diagram of an example server 300 in the session data logging subsystem 102. The server 300 may be any one of the key management server 102a or trust domain servers 102b-1 to 102b-n. The server 300 includes a processor 302, a memory 304, and a communication interface 306. The processor 302 is a microprocessor or microcontroller that is configured to execute program logic instructions (i.e., software) for carrying out various operations and tasks described in this disclosure. For example, the processor 302 is configured to execute key generation logic 308 that is stored in the memory 304 to generate a unique private key for each multimedia communication session in trust domains. In the case of a trust domain server 102b-1 to 102b-n, the memory device 304 stores instructions for trust domain management logic 310. The memory 304 may include read only memory (ROM), random access memory (RAM), magnetic disk storage media devices, optical storage media devices, flash memory devices, electrical, optical or other physical/tangible memory storage devices.

The functions of the processor 302 may be implemented by logic encoded in one or more tangible (non-transitory) computer-readable storage media (e.g., embedded logic such as an application specific integrated circuit, digital signal processor instructions, software that is executed by a processor, etc.), wherein the memory 304 stores data used for the operations described herein and stores software or processor executable instructions that are executed to carry out the operations described herein.

The key generation logic 308 and trust domain management logic 310 may take any of a variety of forms, so as to be encoded in one or more tangible/non-transitory computer readable memory media or storage device for execution, such as fixed logic or programmable logic (e.g., software/computer instructions executed by a processor), and the processor 302 may be an application specific integrated circuit (ASIC) that comprises fixed digital logic, or a combination thereof.

For example, the processor 302 may be embodied by digital logic gates in a fixed or programmable digital logic integrated circuit, which digital logic gates are configured to perform the key generation logic 308 and trust domain management logic 310. In general, the key generation logic 308 and trust domain management logic 310 may be embodied in one or more computer-readable storage media encoded with software comprising computer executable instructions and when the software is executed operable to perform the operations described herein.

The communication interface 306 is configured to transmit or receive signals from a network(s) for the server 300. For example, the communication interface 306 transmits the key to one or more network devices associated with one or more of the entities. Likewise, the communication interface 306 may also receive a request for session data sent from a network device and transmit session data in return.

Figure 4:
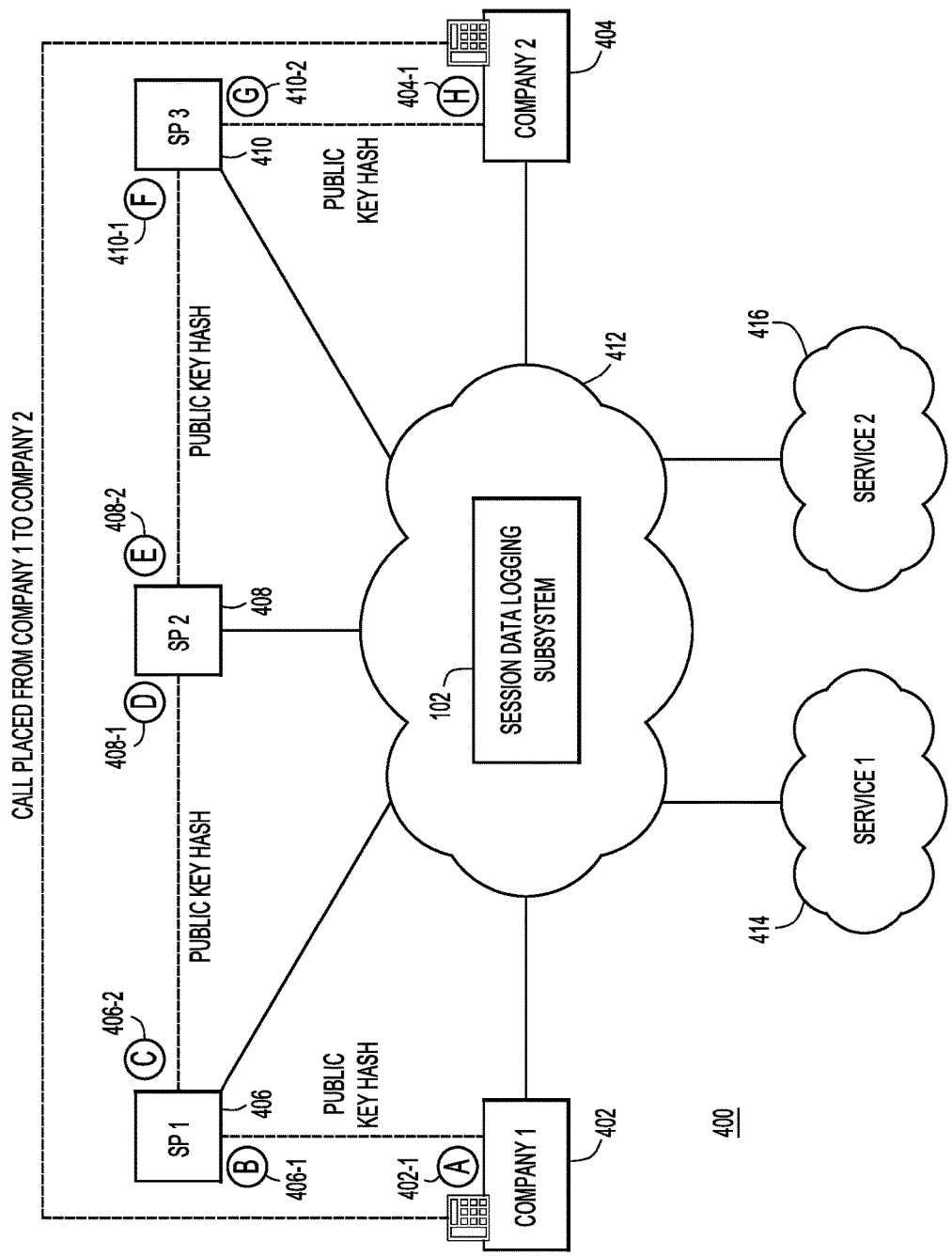
FIG. 4 is a flow diagram depicting the sharing of session data, according to an example embodiment.

FIG. 4 illustrates an example multimedia communication system 400 in a form of Company 1 (402) placing a call to Company 2 (404). The call also traverses, for example, three service providers SP1 (406), SP2 (408), and SP3 (410) between Company 1 (402) and Company 2 (404). The entities 402, 404, 406, 408, and 410 are similar to entities 106 in FIG. 1. Each of the entities 402, 404, 406, 408, and 410 are coupled to a cloud server 412. The cloud server 412 includes the session data logging subsystem 102 shown in FIG. 1 that stores data defining a trust domain among these entities that participate in supporting the multimedia communication session. It should be noted that the trust domain may include entities (not shown in FIG. 4) other than entities 402, 404, 406, 408, and 410 that does not participate in supporting the multimedia communication session 400. The communication session between Company 1 and Company 2 may be supported by any of a variety of on-line services, shown as Service 1 (414) and Service 2 (416).

Each of the entities 402, 404, 406, 408, and 410 includes one or more network edge devices, e.g., network devices 112 in FIG. 1, that communicate to other network edge devices of the entities 402, 404, 406, 408, and 410. As shown in FIG. 4, Company 1 includes an edge network device 402-1 (denoted node A). The service provider SP1 includes two edge network devices 406-1 and 406-2 (denoted nodes B and C, respectively). The service provider SP2 includes two edge network devices 408-1 and 408-2 (denoted nodes D and E, respectively). The service provider SP3 includes two edge network devices 410-1 and 410-2 (denoted nodes F and G, respectively). The Company 2 includes an edge network device 404-1 (denoted node H).

In the multimedia communication session, each network edge device of the entities 402, 404, 406, 408, and 410 acts as a blockchain node and originates a blockchain transaction to record the session data (metadata). For example, when call signaling messages are passed from Company 1 to service provider SP1, network edge device node B at SP1 generates a public key hash value and shares the public key hash value with the network edge device node A at Company 1. After processing call signaling protocol messages associated with the session, the network edge device node A (call control element) at Company 1 originates a blockchain transaction to record a session event using the public key hash value as the recipient address. For example, a session event could be designated as "Session ABC is established from node A in Company 1 to node B in Service provider SP1." The session event contains, for example, high level metadata about the session, such as negotiated codec, DTMF, session bandwidth, media type etc. Specifically, the network edge device node A at Company 1 generates a blockchain transaction to record the session metadata using node B's public key hash value as the recipient address. The blockchain transaction process is conducted independently of session SIP transaction and does not impact SIP message processing time.

When the call data are passed from SP1 to SP2, the network edge device node D at SP2 generates a public key hash value and shares the public key hash value with the network edge device node C at SP1. The network edge device node C at SP1 generates a transaction to record the session metadata using node D's public key hash value as the recipient address. When the call signaling messages are passed from SP2 to SP3, the network edge device node F at SP3 generates a public key hash value and shares the public key hash value with the network edge device node E at SP2. The network edge device node E at SP2 generates a transaction to record the session metadata using node F's public key hash value as the recipient address. When the call signaling messages are passed from SP3 to Company 2, the network edge device node H at Company 2 generates a public key hash value and shares the public key hash value with the network edge device node G at SP3. The network edge device node G at SP3 generates a transaction to record the session metadata using node H's public key hash value as the recipient address. Each of the nodes A, C, E, and G may use a unique private key that the cloud server 412 generated for the session to encrypt private data and leave public data unencrypted.

Each of the entities 402, 404, 406, 408, and 410 forwards the recorded/logged session data (i.e., metadata) including unencrypted public data and encrypted private data to cloud server 412 to be stored therein. In one embodiment, the recorded session data are forwarded by the entities to the cloud server 412 in a non-real time manner. The cloud server 412 then stores the session data in a blockchain. The cloud server 412 can share the logged session data with one or more devices associated with the entities in the trust domain.

In the conventional systems, when a call fails, end customers have to manually contact their service provider to troubleshoot call failures that are not introduced within customer's network (e.g., fax calls, voice quality). If the source of the problem is not within the customer's service provider but somewhere upstream, then the service provider has to contact their peer service providers to further isolate this issue. This manual process typically takes multiple days and is difficult particularly when the call failure happens intermittently.

Techniques presented herein leverage blockchain technology to store session events in a common transactions database, which is shared among participants of a trust domain such as enterprises, telecommunication service providers, and collaboration cloud service providers. A trust domain presented herein can be formed by any device that is blockchain-enabled and takes part in multimedia session processing, establishment and logging. The scale of the trust domain can vary based on need. For example, a trust domain can be established within an organization, with access to only internal devices, across multiple organizational units, or across multiple companies and service provider entities. Consistent with embodiments presented herein, when a multimedia communication session, e.g., a call, fails, a network administrator or a support engineer troubleshooting a given session can use a session tracking tool/system to look at the global session transaction database and identify transactions associated with this session. This will give an end-to-end view of the call signaling path along with session metadata from all organizations processing this session.

As explained above, a session identifier (ID) is part of public data and not encrypted. All participating entities can search the common transaction database by providing the local or remote universally unique identifier (UUID) or both of the session IDs and/or by using a specific error response code. All entities that are part of the same session are authorized to view the encrypted private data. The entities can request the unique private key associated with the given session from a key management server in the cloud server and use this key to decrypt the private data. Other entities in the trust domain that are not part of the session are authorized to view the public data. In one embodiment, other entities that are not part of the session may be authorized to view the private data based on predefined authorization policies.

To track session data, a user of an entity uses a user device (e.g., network administrator device 110 shown in FIG. 1), such as a mobile phone, a tablet, a laptop, or a desktop to log into a session tracking system and selects a session of interest by entering the called number/URI, calling number/URI, time range etc. The device can retrieve a session ID based on the user input. The user device then forwards a request for session data to the session data logging subsystem 102. The user device retrieves session data from the session data logging subsystem 102, and searches for all blockchain transactions that are associated with the session ID. The user device also retrieves the unique private key associated with the session from a key management server and uses the unique private key to decrypt the private session data stored within each blockchain transaction. The user device may display the session data, e.g., an end-to-end view of a call trace.

FIG. 5A shows an example Key Management Storage (KMS) 501 that stores unique private keys according to an embodiment. As shown in FIG. 5A, the KMS 501 stores Key 1 for session 1, Key 2 for Session 2, etc. The KMS 501 may be part of the key management server 102a or the storage 102c.

FIG. 5B shows an example trust domain roster 502 according to an embodiment. The trust domain roster 502 shows members in a trust domain, which includes Company 1, Company 2, service providers SP1, SP2, and, SP3. The trust domain roster 502 can be stored in the trust domain servers 102b or the storage 102c.

FIG. 5C shows an example global trusted session ledger 503 according to an embodiment. The global trusted session ledger 503 includes blockchain transactions that contain details such as session data, origination network devices (A, C, E, and G) and destination network devices (B, D, F, and H). FIG. 5C shows individual transactions chained together and stored in one block, as an example.

Figure 5D:
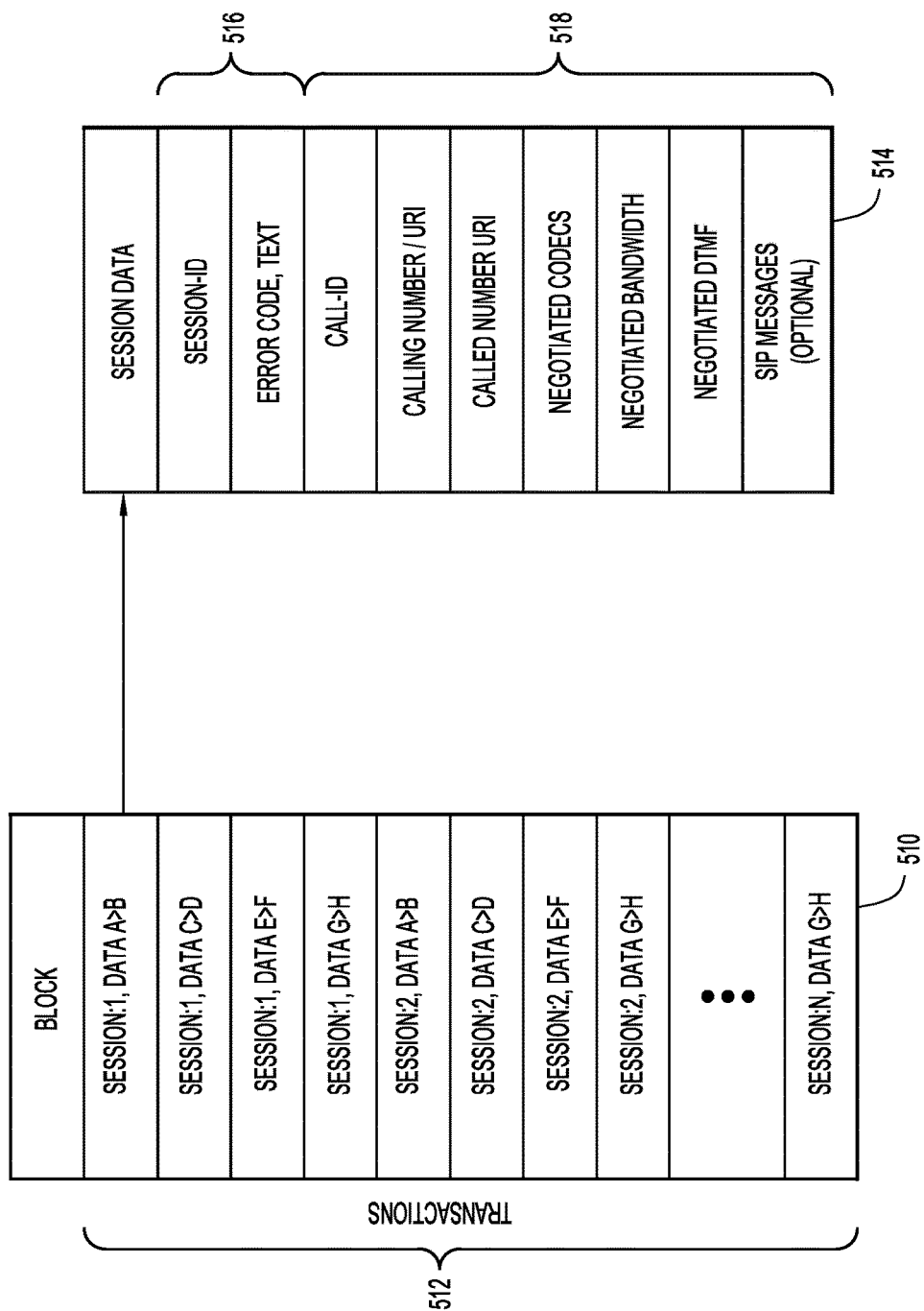
FIG. 5D illustrates a diagram of a blockchain record of session data, according to an example embodiment.

FIG. 5D illustrates an example of data logged in blockchain 510 according to an embodiment. The blockchain 510 includes a plurality transactions 512 that are associated with different sessions. Each transaction 512 is generated by a network edge device of Company 1 (402), SP1 (406), SP2 (408), and SP3 (410) in FIG. 4 for Sessions 1, 2 . . . N. Each transaction 512 contains metadata about the session. Referring to FIG. 5D, for example, "Session 1" includes transactions 512 generated and sent from node A (402-1), node C (406-2), node E (408-2), and node G (410-2). A set of session data 514 includes public data 516 and private data 518. As explained above, public data 516, such as the session ID, error response code, or error response text are not encrypted while private data 518, such as the user ID, device ID, IP address, media capability, session type, call ID, calling number/URI, called number/URI, negotiated codecs, negotiated bandwidth, negotiated DTMF, or optional SIP messages are encrypted.

Figure 6:
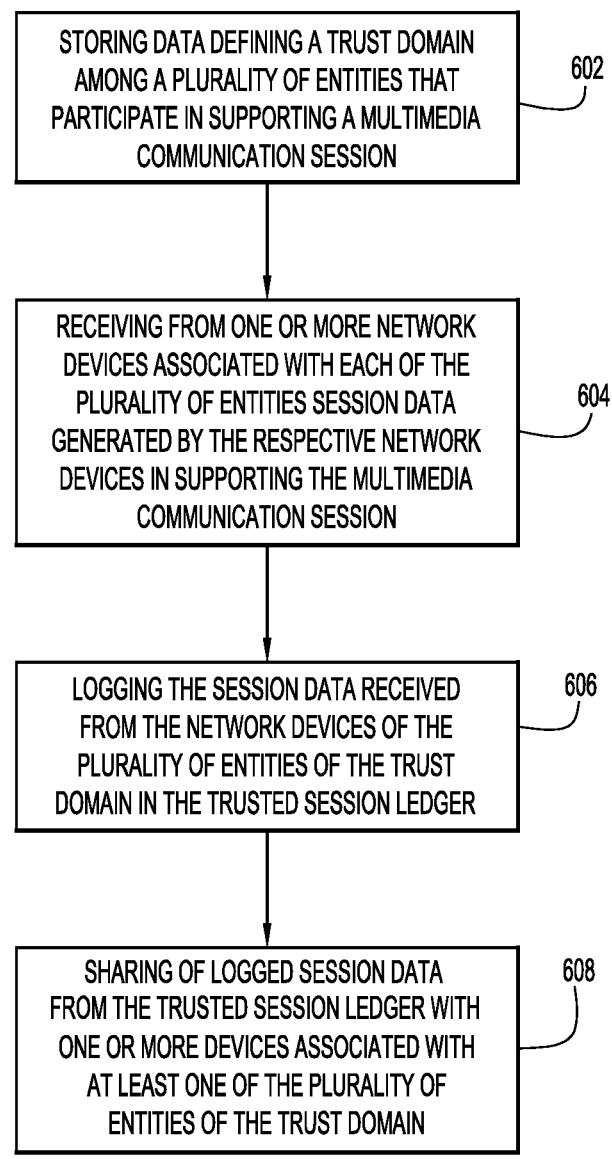
FIG. 6 is a flow chart of a method for sharing session data among a plurality of entities in a trust domain, according to an example embodiment.

FIG. 6 is a flow chart illustrating a method 600 for sharing data in a trust domain according to an example embodiment. In 602, one or more servers (e.g., session data logging subsystem 102) stores data defining a trust domain among a plurality of entities that participate in supporting a multimedia communication session. Each of the plurality of entities has at least one network device that is involved in handling traffic or control signaling for the multimedia communication session. In 604, the one or more servers receive from one or more network devices associated with each of the plurality of entities session data generated by the respective network devices in supporting the multimedia communication session. In 606, the one or more servers log the session data received from the network devices of the plurality of entities of the trust domain in the trusted session ledger, and in 608, share the logged session data from the trusted session ledger with one or more devices associated with at least one of the plurality of entities of the trust domain.

Figure 7:
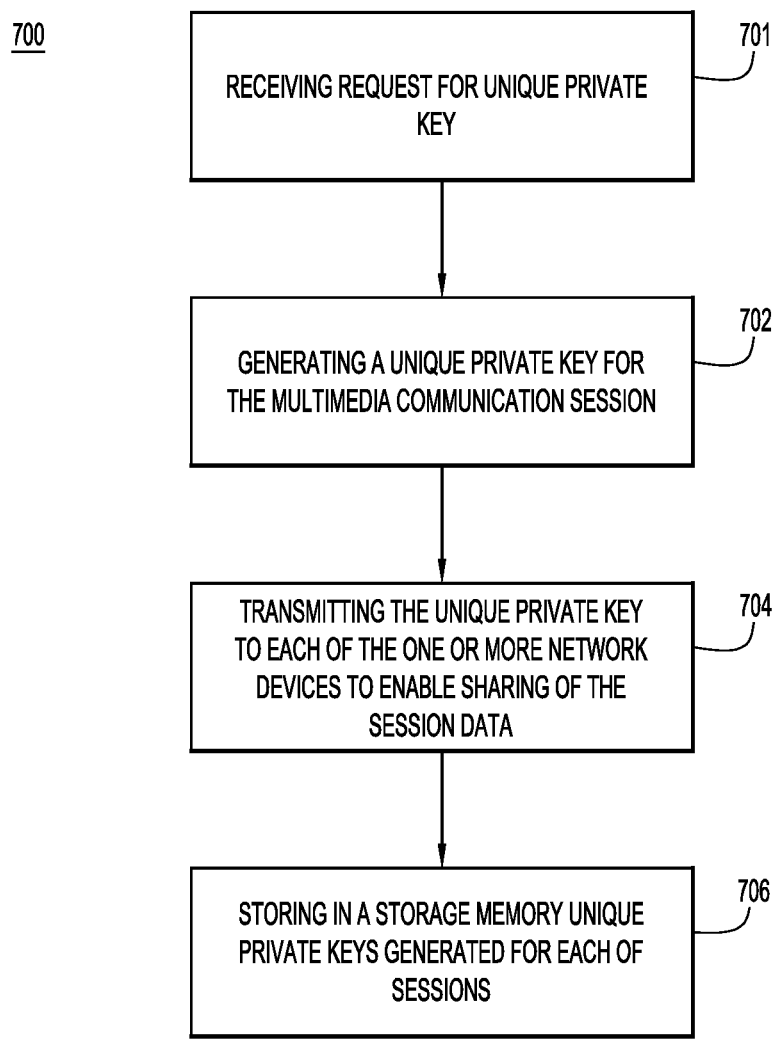
FIG. 7 is a flow chart of a method for managing private keys for multimedia communication sessions, according to an example embodiment.

FIG. 7 is a flow chart illustrating a method 700 for key management according to an example embodiment. For example, each of the network devices logging the session data may make a request to a key management server in a session data logging subsystem or a cloud server for a private key to encrypt personally identifiable information and other confidential information for session data. In 701, the key management server receives one or more requests for a unique private key from the network devices. In some embodiments, the key management server may act on its own to generate a unique private key whenever it detects a beginning of a new communication session. In 702, in response to a request from a network device or upon detection of a new multimedia communication session, the key management server generates a unique private key for each multimedia communication session in a trust domain. In 704, the key management server forwards the unique private key to a network device associated with the entities participating in supporting the multimedia communication session to enable sharing of the session data. For example, an edge network device of an entity may use the unique private key to encrypt private session data the edge network device generated during the session or to decrypt encrypted session data in each transaction stored in a blockchain. In 706, the key management server stores each unique private key for each session in a key storage memory. It is to be understood that the sequence of the above steps may be modified. For example, step 706 may be performed before or simultaneously with step 704.

Figure 8:
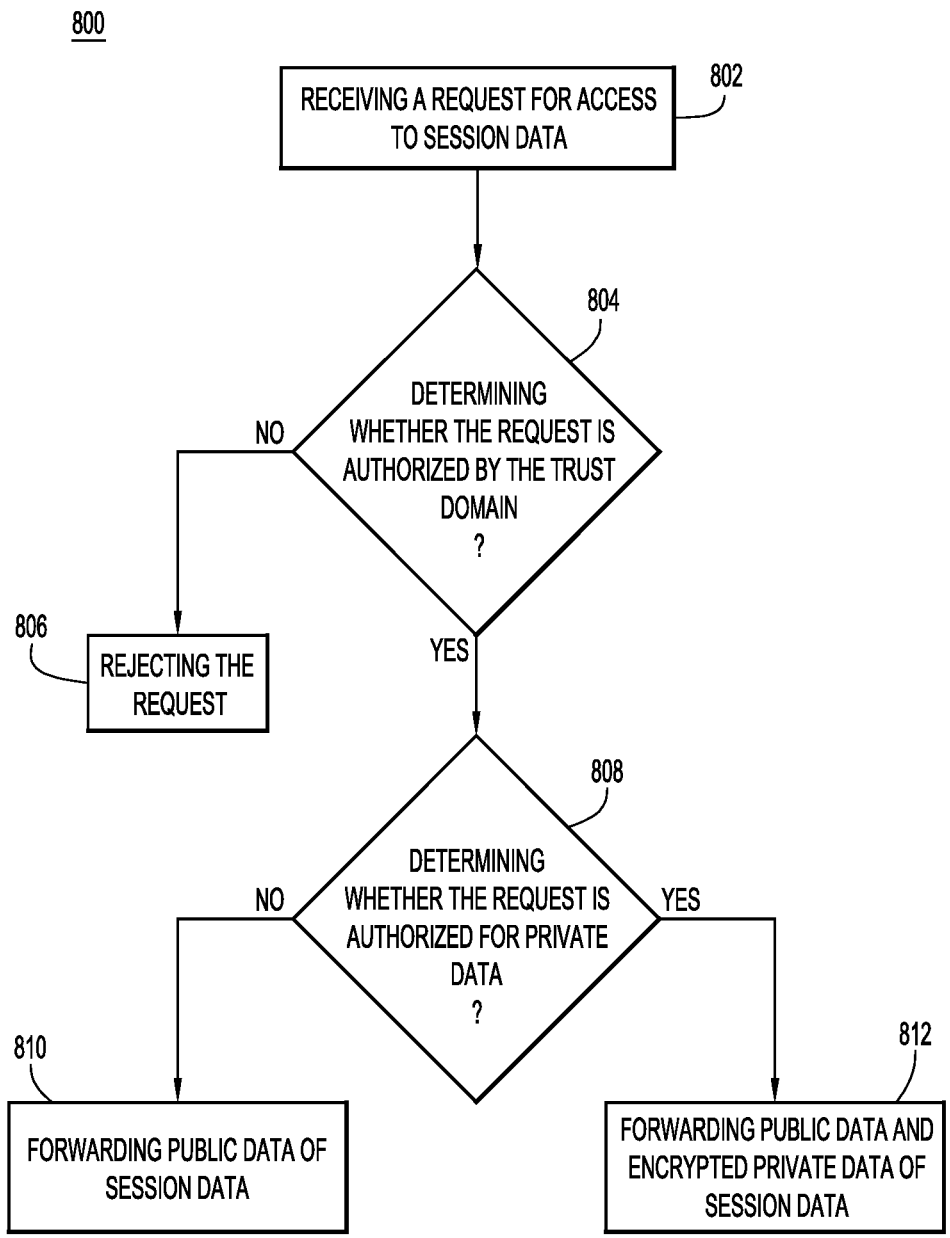
FIG. 8 is a flow chart of a method for sharing logged session data, according to an example embodiment.

FIG. 8 is a flow chart illustrating a method 800 for sharing logged session data according to an example embodiment. In 802, one or more servers (e.g., session data logging subsystem 102) receive a request for access to logged session data for a particular multimedia communication session conducted in a trust domain. In one embodiment, the request includes a session ID to identify the requested session data. In 804, the one or more servers determine whether the request is authorized by the trust domain. For example, the one or more servers check an entity identifier or a device identifier of the network device that sends the request. If the entity identifier or the device identifier indicates that the entity sending the request belongs to the trust domain, the one or more servers determine that the request is authorized by the trust domain. If the one or more servers determine that the request is not authorized by the trust domain, in 806 the one or more servers reject the request and do not return any session data to the entity that requests the session data. If the one or more servers determine that the request is authorized by the trust domain, in 808 the one or more servers further determines whether the request is authorized for private session data. For example, the one or more servers determine whether the entity that sends the request participated in the multimedia communication session. If the session data logging subsystem 102 determines that the entity did not participate in the session, the one or more servers determine that the request is not authorized for private data. In 810, the one or more servers return only public data of the session data to the requesting entity. If the one or more servers determine that the entity participated in the session, the one or more servers determine that the request is authorized for private data and in 812 returns both public and private data of the session data to the requesting entity.

Figure 9:
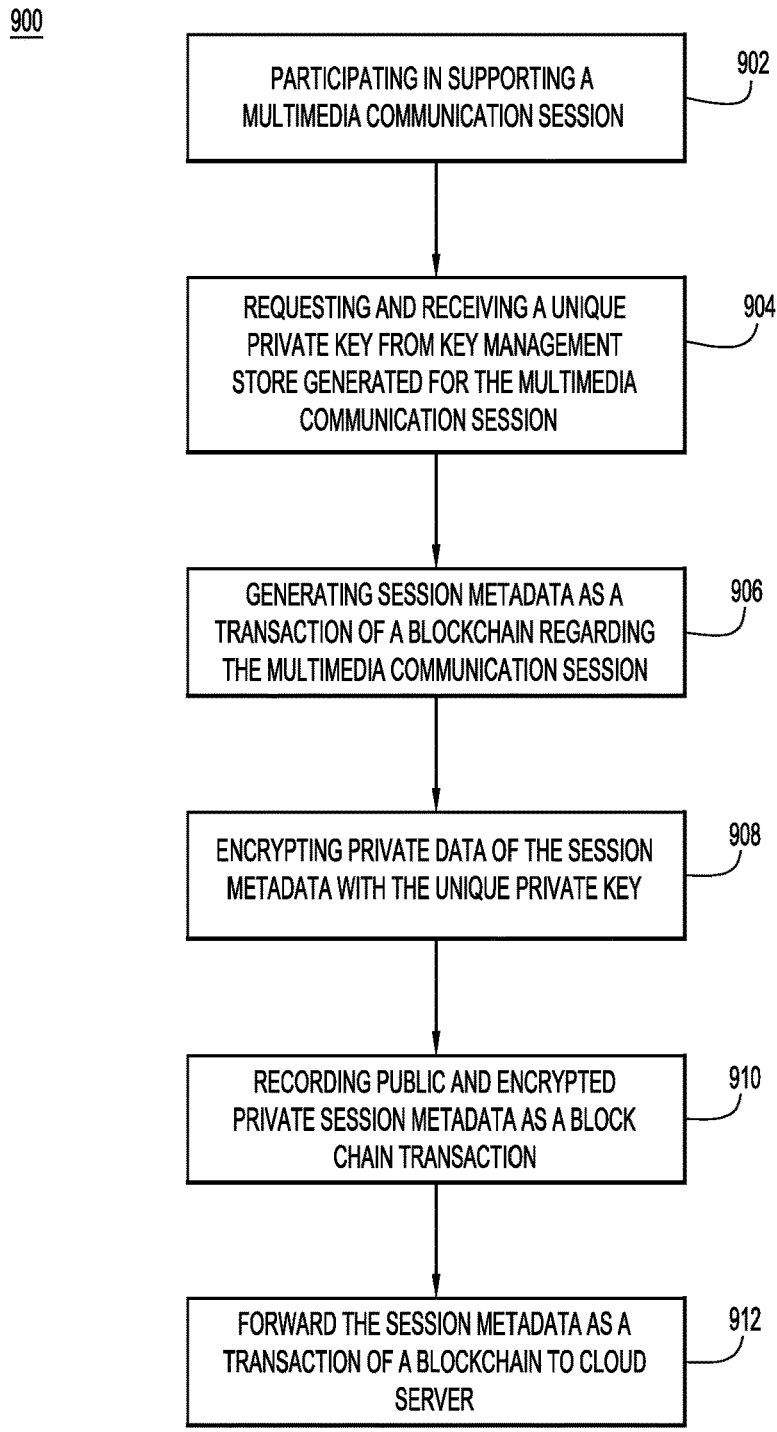
FIG. 9 is a flow chart of a method for recording session data generated in a multimedia communication session in a trust domain, according to an example embodiment.

FIG. 9 is a flow chart illustrating a method 900 for recording session data generated in a multimedia communication session in a trust domain according to an example embodiment. In 902, an edge network device in the trust domain participates in the multimedia communication session. The edge network device is blockchain enabled. In 904, the edge network device requests and receives a unique private key from a key management store generated for the multimedia communication session. In 906, the edge network device generates session metadata regarding the operations in the session as a transaction of a blockchain. In 908, the edge network device encrypts the session metadata with the unique private key. Specifically, the edge network device encrypts private data of the session metadata with the unique private key and leaves public data of the session metadata unencrypted. In 910, the edge network device records public and encrypted private session metadata as a blockchain transaction. In 912, the edge network device forwards the session metadata as a transaction of a blockchain to a cloud server.

Figure 10:
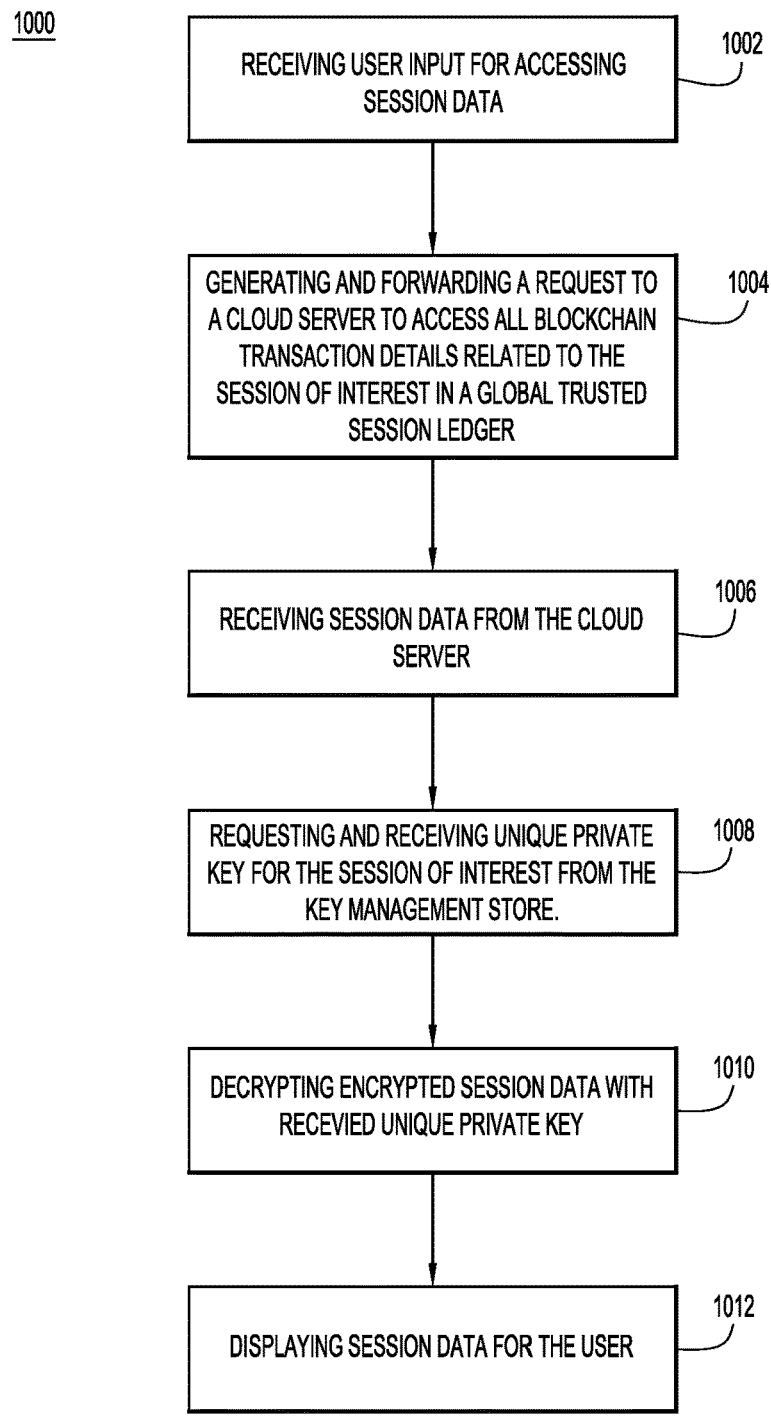
FIG. 10 is a flow chart of a method for tracking session data generated in a multimedia communication session in a trust domain, according to an example embodiment.

FIG. 10 is a flow chart illustrating a method 1000 for tracking session data generated in a multimedia communication session in a trust domain according to an example embodiment. In 1002, a user (network administrator) device associated with an entity receives a user input for accessing session data. In one embodiment, the user input may include called number/URI, calling number/URI, time range, session ID, etc. The user device uses the user input to locate the session ID for the session data of interest. In 1004, the user device generates and forwards a request to one or more servers (cloud server) that manage the session data to access all blockchain transaction details related to the session of interest stored in a global trusted session ledger. In one embodiment, the request includes the session ID. In 1006, the user device receives the requested session data from the cloud server. In some embodiments, the user device receives all related blockchain transactions having both public data and encrypted private data stored in each transaction if the user device is authorized for all related blockchain transactions. The private data is sent by the servers if the requesting entity is authorized to view private data. In 1008, the user device requests and receives a unique private key for the session of interest from a key management store. In 1010, the user device uses the unique private key generated for the session to decrypt encrypted session data. In 1012, the user device displays the session data for the user.

Techniques disclosed herein are a blockchain-based secure, distributed, immutable transaction database that stores and shares multimedia communication session data among participants of a trust domain such as enterprises, telecommunication (e.g. public switched telephone network) service providers, and collaboration cloud service providers. The embodiments in this disclosure accelerate a solution-level troubleshooting process by eliminating manual engagement with service providers for collecting collaboration session-related data and by using protocol-level techniques such as Session ID or "Log Me".

In one embodiment, one or more servers establish trust domains of arbitrary size and even across multiple clouds, service providers or enterprises, provide a secure framework where session transactions are recorded in an immutable ledger that is available to all blockchain-enabled nodes in the trust domain. This allows end-to-end tracing of multimedia communication sessions with variable levels of granularity, and enables solution support vendors to troubleshoot and quickly isolate causes or problems based on the session metadata available in the common transactions database without waiting for data to be made available by individual service providers and enterprises.

In one embodiment, a system has the ability to set up trust domains that allow domain-based feature enablement. Trust domains across vendors and/or service providers allow signaling protocol messages to be trusted and passed through without removal or modification to specific headers (e.g., Session-ID, etc.) by devices such as SBCs. The embodiments presented herein are applicable to any vendor with a collaboration or multimedia product, such as call accounting, call tracing, path isolation, session recording domains, feature registration (e.g., call forking, etc.), trust domain membership roster maintenance, etc. Disclosed systems and methods allow tracking sessions, such as audio, video, fax, or modem call, within a trust domain. The disclosed embodiments can be implemented as applications, enabling trust relationships across enterprise/SP boundaries, simplified troubleshooting process, session tracking, standardized log collection and access, etc.

In summary, in one aspect, a method is provided that includes: at one or more servers, storing data defining a trust domain among a plurality of entities that participate in supporting a multimedia communication session, each of the plurality of entities having at least one network device that is involved in handling traffic or control signaling for the multimedia communication session; receiving, at the one or more servers, from one or more network devices associated with each of the plurality of entities session data generated by the respective network devices in supporting the multimedia communication session; logging the session data received from the network devices of the plurality of entities of the trust domain; and sharing, by the one or more servers, of logged session data with one or more devices associated with at least one of the plurality of entities of the trust domain.

In another aspect, an apparatus is provided includes a communication interface that enables network communications, a processor; and a memory to store data and instructions executable by the processor. The processor is configured to execute the instructions to: store data defining a trust domain among a plurality of entities that participate in supporting a multimedia communication session, each of the plurality of entities having at least one network device that is involved in handling traffic or control signaling for the multimedia communication session; receive from one or more network devices associated with each of the plurality of entities session data generated by the respective network devices in supporting the multimedia communication session; log the session data received from the network devices of the plurality of entities of the trust domain; and share logged session data with one or more devices associated with at least one of the plurality of entities of the trust domain.

In another aspect, a non-transitory computer-readable storage media is provided that is encoded with software comprising computer executable instructions which, when executed by a processor of an apparatus, cause the processor to perform operations including: storing data defining a trust domain among a plurality of entities that participate in supporting a multimedia communication session, each of the plurality of entities having at least one network device that is involved in handling traffic or control signaling for the multimedia communication session; receiving from one or more network devices associated with each of the plurality of entities session data generated by the respective network devices in supporting the multimedia communication session; logging the session data received from the network devices of the plurality of entities of the trust domain; and sharing of logged session data with one or more devices associated with at least one of the plurality of entities of the trust domain.

The above description is intended by way of example only. Various modifications and structural changes may be made therein without departing from the scope of the concepts described herein and within the scope and range of equivalents of the claims.

What is claimed is:

1. A method comprising:
   at one or more servers, storing data defining a trust domain among a plurality of entities that participate in supporting a multimedia communication session, each of the plurality of entities having at least one network device that is involved in handling traffic or control signaling for the multimedia communication session;
   transmitting, by the one or more servers, a unique private key for encrypting session data to the one or more of the network devices to enable sharing of the session data, wherein the session data is generated by the one or more of the network devices in supporting the multimedia communication session;
   receiving the session data at the one or more servers from the one or more of the network devices;
   logging the session data received from the one or more of the network devices as transactions in a blockchain to generate logged session data; and
   sharing, by the one or more servers, the logged session data with at least one of the plurality of entities.

2. The method of claim 1, further comprising:
   generating, by the one or more servers, the unique private key.

3. The method of claim 2, wherein:
   the session data includes public data and private data for the multimedia communication session; and
   the private data is encrypted with the unique private key to generate encrypted private data.

4. The method of claim 3, wherein the logged session data includes logged session data associated with a session identifier for the multimedia communication session, and wherein sharing includes:
   receiving a request, at the one or more servers, for access to the logged session data;
   determining whether the request is authorized by the trust domain;
   if the request is not authorized by the trust domain, rejecting the request; and
   if the request is authorized by the trust domain, retrieving the logged session data associated with the session identifier for the multimedia communication session.

5. The method of claim 4, further comprising:
   forwarding the public data based on the request if the request is authorized only to access the public data; and
   forwarding the public data and the encrypted private data of the logged session data based on the request if the request is authorized to access the private data.

6. The method of claim 3, wherein the public data includes one or more of a session identifier, one or more error codes, or error texts.

7. The method of claim 3, wherein the private data includes one or more of user identities, device identities, Internet Protocol addresses, media capabilities, or session type information.

8. An apparatus comprising:
   a communication interface that enables network communications;
   a processor; and
   a memory to store instructions executable by the processor, wherein the processor is configured to execute the instructions to:
   store data defining a trust domain among a plurality of entities that participate in supporting a multimedia communication session, each of the plurality of entities having at least one network device that is involved in handling traffic or control signaling for the multimedia communication session;
   transmit a unique private key for encrypting session data to the one or more of the network devices to enable sharing of the session data, wherein the session data is generated by the one or more of the network devices in supporting the multimedia communication session;
   receive the session data from the one or more of the network devices;
   log the session data received from the one or more of the network devices as transactions in a blockchain to generate logged session data; and
   share the logged session data with at least one of the plurality of entities.

9. The apparatus of claim 8, wherein the processor is further configured to:
   generate the unique private key.

10. The apparatus of claim 9, wherein:
    the session data includes public data and private data for the multimedia communication session; and
    the private data is encrypted with the unique private key to generate encrypted private data.

11. The apparatus of claim 10, wherein the logged session data includes logged session data associated with a session identifier for the multimedia communication session, and wherein the processor is configured to share by:
    receiving a request for access to the logged session data;
    determining whether the request is authorized by the trust domain;
    if the request is not authorized by the trust domain, rejecting the request; and
    if the request is authorized by the trust domain, retrieving the logged session data associated with the session identifier for the multimedia communication session.

12. The apparatus of claim 11, wherein the processor is further configured to:
    forward the public data based on the request if the request is authorized only to access the public data; and
    forward the public data and the encrypted private data of the logged session data based on the request if the request is authorized to access the private data.

13. The apparatus of claim 10, wherein the public data includes one or more of a session identifier, one or more error codes, or error texts.

14. The apparatus of claim 10, wherein the private data includes one or more of user identities, device identities, Internet Protocol addresses, media capabilities, or session type information.

15. A non-transitory computer-readable storage media encoded with software comprising computer executable instructions which, when executed by a processor of an apparatus, cause the processor to perform operations including:
    storing data defining a trust domain among a plurality of entities that participate in supporting a multimedia communication session, each of the plurality of entities having at least one network device that is involved in handling traffic or control signaling for the multimedia communication session;
    transmitting a unique private key for encrypting session data to the one or more of the network devices to enable sharing of the session data, wherein the session data is generated by the one or more of the network devices in supporting the multimedia communication session;

receiving the session data from the one or more of the network devices;

logging the session data received from the one or more of the network devices as transactions in a blockchain to generate logged session data; and sharing the logged session data with at least one of the plurality of entities.

16. The non-transitory computer-readable storage media of claim 15, wherein the instructions further cause the processor to perform operations including:

generating the unique private key.

17. The non-transitory computer-readable storage media of claim 16, wherein:

the session data includes public data and private data for the multimedia communication session; and the private data is encrypted with the unique private key to generate encrypted private data.

18. The non-transitory computer-readable storage media of claim 17, wherein the logged session data includes logged session data associated with a session identifier for the multimedia communication session, and wherein the instructions that cause the processor to share include instructions that cause the processor to perform operations including:

receiving a request for access to the logged session data;

determining whether the request is authorized by the trust domain;

if the request is not authorized by the trust domain, rejecting the request; and if the request is authorized by the trust domain, retrieving the logged session data associated with the session identifier for the multimedia communication session.

19. The non-transitory computer-readable storage media of claim 18, wherein the instructions further cause the processor to perform operations including:

forwarding the public data based on the request if the request is authorized only to access the public data; and forwarding the public data and the encrypted private data of the logged session data based on the request if the request is authorized to access the private data.

20. The non-transitory computer-readable storage media of claim 17, wherein:

the public data includes one or more of a session identifier, one or more error codes, or error texts; and the private data includes one or more of user identities, device identities, Internet Protocol addresses, media capabilities, or session type information.

* * * * *